United States Patent
Boucadair et al.

(10) Patent No.: US 12,506,773 B2
(45) Date of Patent: Dec. 23, 2025

(54) COMMUNICATION MANAGEMENT METHOD AND ASSOCIATED DEVICES

(71) Applicant: Orange, Issy-les-Moulineaux (FR)

(72) Inventors: Mohamed Boucadair, Chatillon (FR); Christian Jacquenet, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 392 days.

(21) Appl. No.: 17/913,596

(22) PCT Filed: Mar. 25, 2021

(86) PCT No.: PCT/FR2021/050515
§ 371 (c)(1),
(2) Date: Sep. 22, 2022

(87) PCT Pub. No.: WO2021/191567
PCT Pub. Date: Sep. 30, 2021

(65) Prior Publication Data
US 2023/0146254 A1     May 11, 2023

(30) Foreign Application Priority Data
Mar. 26, 2020  (FR) ...................................... 2002986

(51) Int. Cl.
*H04L 9/40*     (2022.01)

(52) U.S. Cl.
CPC ...... *H04L 63/1458* (2013.01); *H04L 63/1416* (2013.01); *H04L 63/1425* (2013.01)

(58) Field of Classification Search
CPC ............. H04L 63/1458; H04L 63/1416; H04L 63/1425; H04L 2463/141; H04L 63/166
See application file for complete search history.

(56) References Cited

U.S. PATENT DOCUMENTS 9,756,071 B1 *   9/2017   Golshan ................ G06F 16/951
11,563,772 B2 *   1/2023   Doron ................... H04L 43/0876
(Continued)

FOREIGN PATENT DOCUMENTS

CN     109309685 A     2/2019
CN     109644186 A     4/2019
(Continued)

OTHER PUBLICATIONS

English translation of the Written Opinion of the International Searching Authority dated Aug. 25, 2021 for corresponding International Application No. PCT/FR2021/050515, filed Mar. 25, 2021.

(Continued)

*Primary Examiner* — Christopher A Revak
(74) *Attorney, Agent, or Firm* — David D. Brush; Westman, Champlin & Koehler, P.A.

(57) ABSTRACT

A method for managing communications in accordance with a given transport protocol. The method is implemented by a first device and includes, following detection of a cyber attack, activating, in the first device, collaboration with at least one entity of the network in order to mitigate the cyber attack, this collaboration including execution, by the first device, of at least one determined action, called collaboration action, during at least one the communication of the first device in accordance with the given transport protocol, via the network.

19 Claims, 4 Drawing Sheets

(56) References Cited

U.S. PATENT DOCUMENTS

| | | | |
|---|---|---|---|
| 2015/0172311 A1* | 6/2015 | Freedman | H04L 63/20 |
| | | | 726/1 |
| 2018/0007084 A1 | 1/2018 | Reddy et al. | |
| 2019/0208040 A1 | 7/2019 | Boucadair et al. | |
| 2020/0099766 A1 | 3/2020 | Fromentoux et al. | |
| 2021/0112091 A1* | 4/2021 | Compton | H04L 63/1416 |
| 2021/0329028 A1* | 10/2021 | Konda | H04L 45/745 |
| 2022/0078205 A1* | 3/2022 | Bjarnason | H04L 63/1425 |
| 2023/0164176 A1* | 5/2023 | Bjarnason | H04L 63/1416 |
| | | | 726/23 |

FOREIGN PATENT DOCUMENTS

| | | | |
|---|---|---|---|
| CN | 110495155 A | 11/2019 | |
| WO | WO-2023239813 A1 * | 12/2023 | H04L 63/1425 |

OTHER PUBLICATIONS

International Search Report dated Aug. 17, 2021 for corresponding International Application No. PCT/FR2021/050515, filed Mar. 25, 2021.

Written Opinion of the International Searching Authority dated Aug. 17, 2021 for corresponding International Application No. PCT/FR2021/050515, filed Mar. 25, 2021.

J. Iyengar et al., "QUIC: A UDP-based multiplexed and secure transport", draft-ietf-quic-transport, Nov. 4, 2019.

Z. Durumeric et al., "The security impact of HTTPS interception", NDSS, 2017.

Kuehlewind et al., "Manageability of the QUIC Transport Protocol draft-ietf-quic-manageability-06", No. 6, Jan. 7, 2020 (Jan. 6, 2020), pp. 1-22, Manageability of the QUIC Transport Protocol; Draft-IETF-QUIC-Manageability-06-txt; Internet-Draft: Network Working Group, Internet Engineering Task Force, IETF; Standardworkingdraft, Internet Society, retrieved from Internet: https://tools.ietf/org/html/draft-ietf0quic-manageability-06, XP015137156.

George Oikonomou et al., "A Framework for a Collaborative DDoS Defense", Computer Security Applications Conference, 2006, ACSAC '06, 22nd Annual, IEEE, PI, Dec. 1, 2006 (Dec. 1, 2006), pp. 33-42, ISBN: 978-0-7695-2716-1. XP031033546.

Jessica Steinberger et al., "Collaborative DDoS Defense using Flow-based Security Event Information", NOMS 2016-2016 IEEE/IFIP Network Operations and Management Symposium, IEEE, Apr. 25, 2016 (Apr. 25, 2016), pp. 516-522 DOI: 10.1 109/NOMS.2016.7502852, XP032918144.

English translation and First Chinese Office Action dated Jan. 24, 2025 for corresponding Chinese Application No. 202180023405.5.

* cited by examiner

[Fig 1]
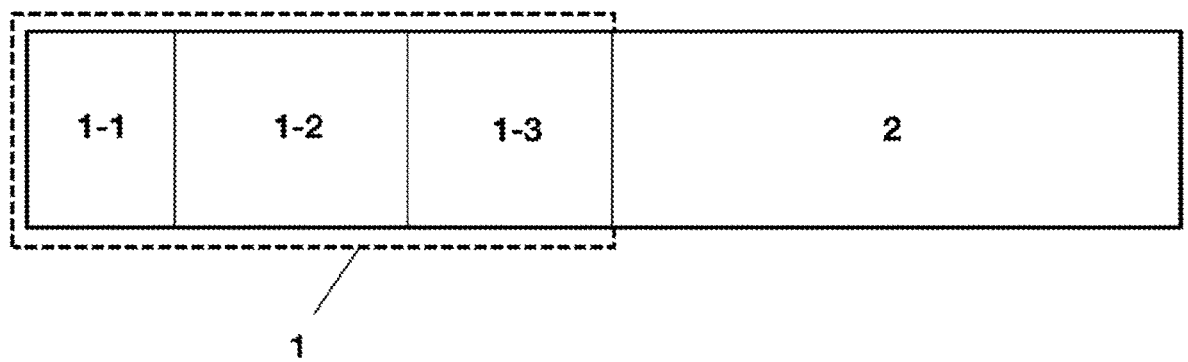
[Fig 2]
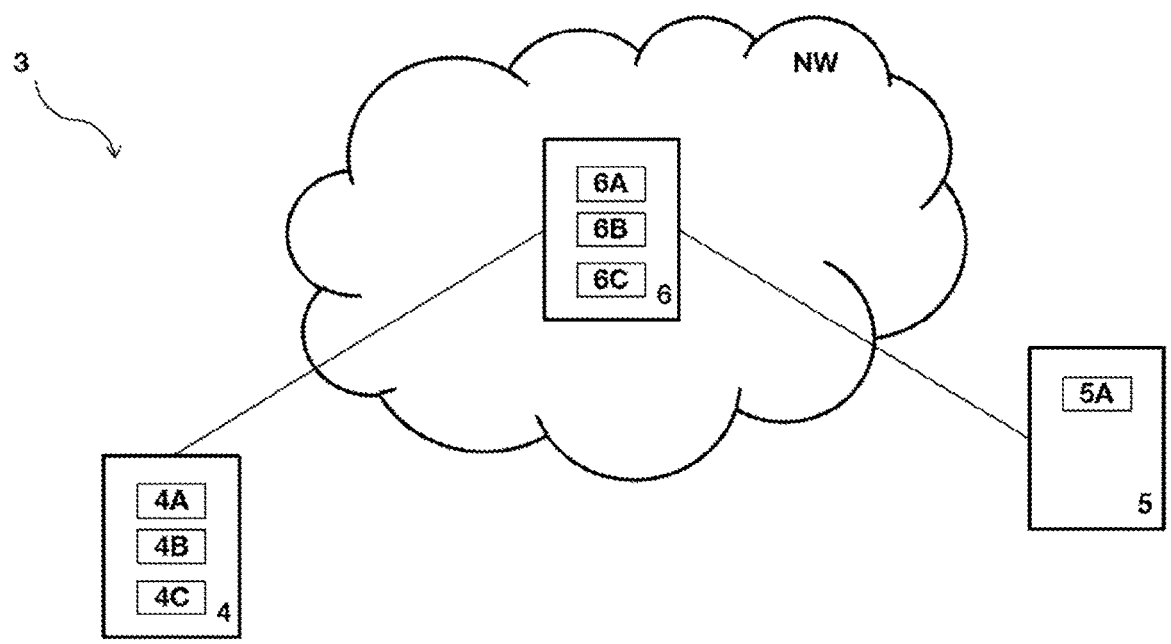

[Fig 3]
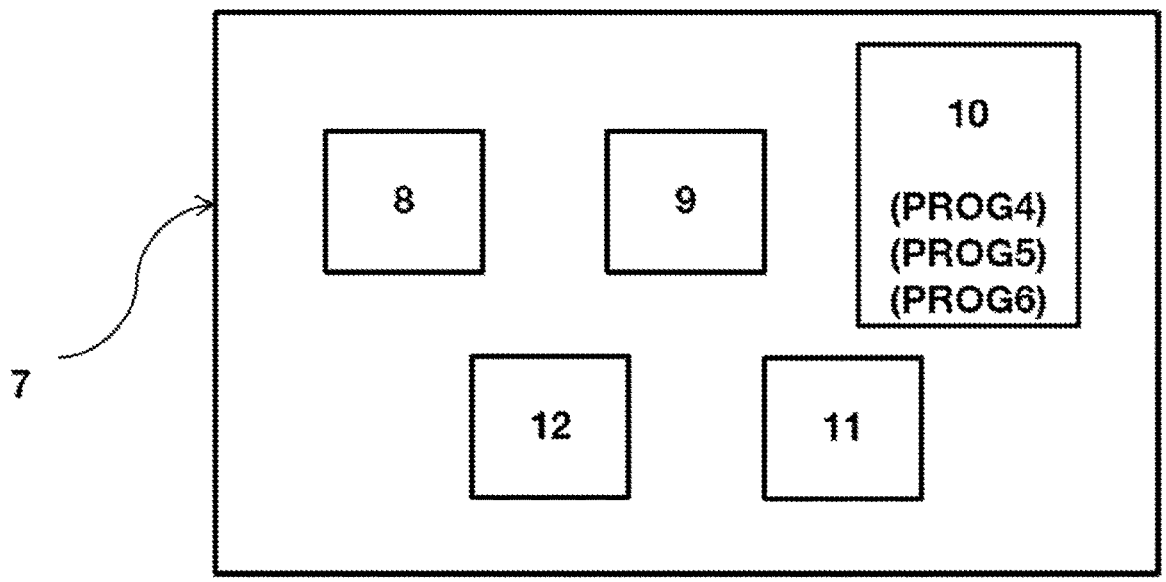
[Fig 4]
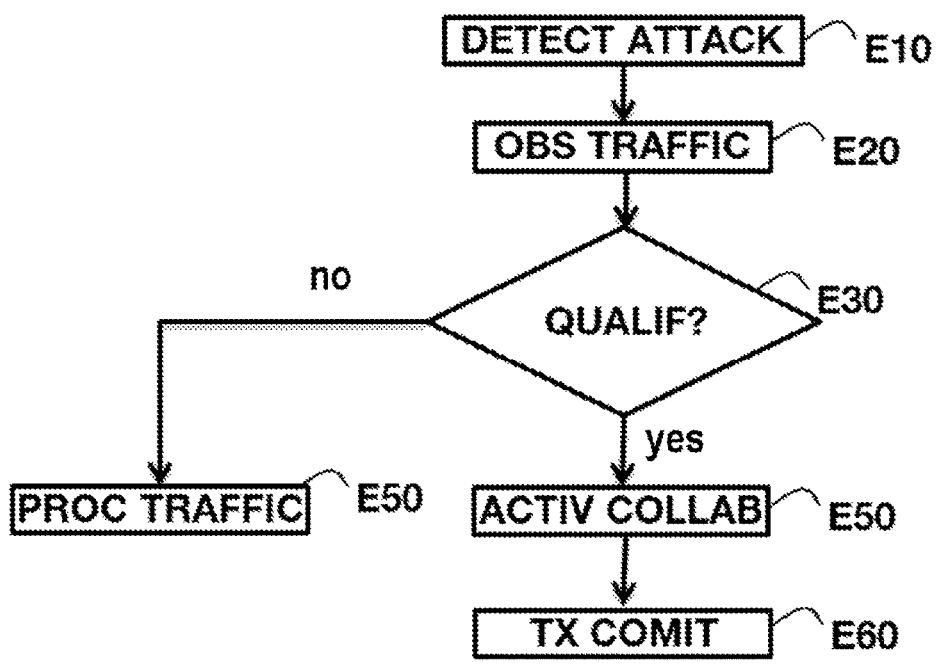

[Fig 5]
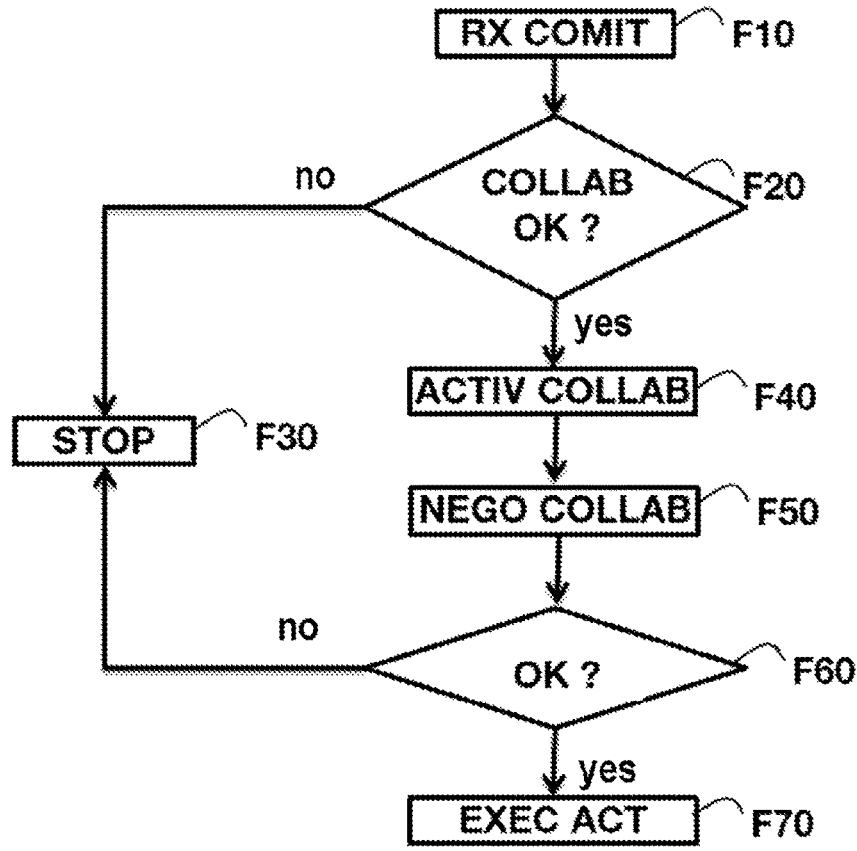
[Fig 6]
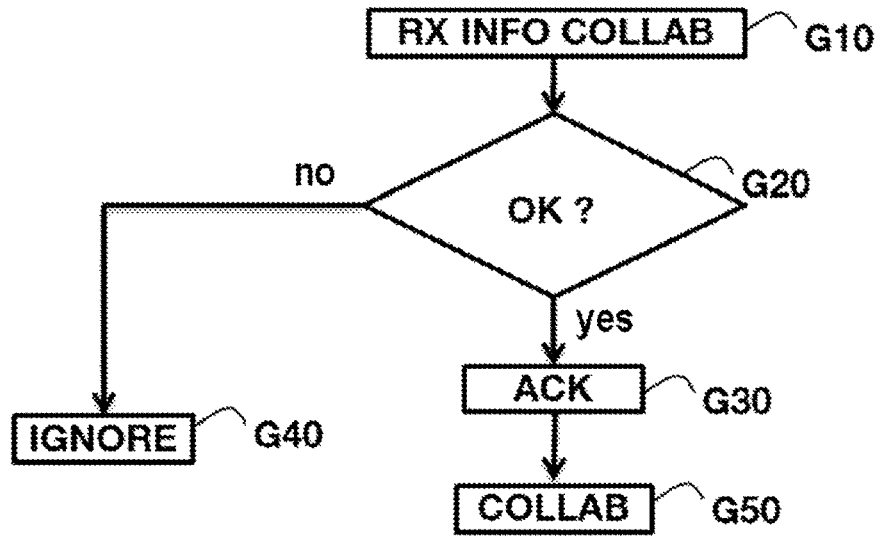

[Fig 7]
```
 0 1 2 3 4 5 6 7 8 9 0 1 2 3 4 5 6 7 8 9 0 1 2 3 4 5 6 7 8 9 0 1
+-+-+-+-+-+-+-+-+
|0|1|S|R|C|K|P P|
+-+-+-+-+-+-+-+-+-+-+-+-+-+-+-+-+-+-+-+-+-+-+-+-+-+-+-+-+-+-+-+-+
|             Destination Connection ID (0..160)            ...
+-+-+-+-+-+-+-+-+-+-+-+-+-+-+-+-+-+-+-+-+-+-+-+-+-+-+-+-+-+-+-+-+
|                 Packet Number (8/16/24/32)                ...
+-+-+-+-+-+-+-+-+-+-+-+-+-+-+-+-+-+-+-+-+-+-+-+-+-+-+-+-+-+-+-+-+
|                    Public Control Status                
+-+-+-+-+-+-+-+-+-+-+-+-+-+-+-+-+-+-+-+-+-+-+-+-+-+-+-+-+-+-+-+-+
|                    Protected Payload (*)                  ...
+-+-+-+-+-+-+-+-+-+-+-+-+-+-+-+-+-+-+-+-+-+-+-+-+-+-+-+-+-+-+-+-+
```
[Fig 8]
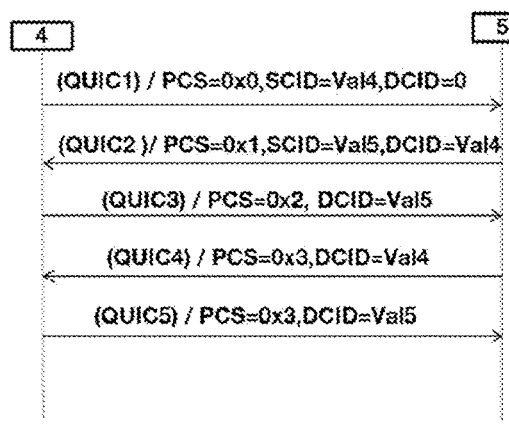
Fig 8A
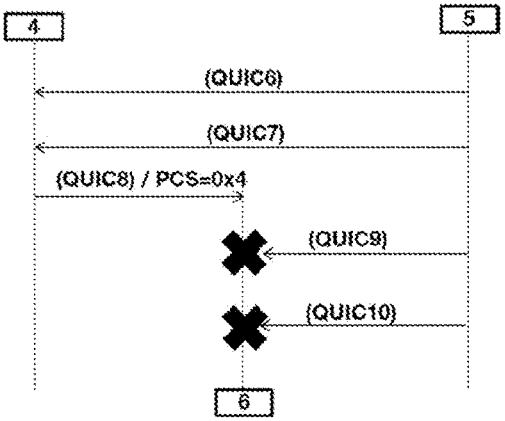
Fig 8B
[Fig 9]
Fig 9A
Fig 9B

COMMUNICATION MANAGEMENT METHOD AND ASSOCIATED DEVICES

CROSS-REFERENCE TO RELATED APPLICATIONS

This Application is a Section 371 National Stage Application of International Application No. PCT/FR2021/050515, filed Mar. 25, 2021, which is incorporated by reference in its entirety and published as WO 2021/191567 A1 on Sep. 30, 2021, not in English.

PRIOR ART

The invention relates to the general field of telecommunications.

It relates more particularly to a mechanism for facilitating, in the event of detection of a cyber attack, the management and the operation of security services operating within an IP (Internet Protocol) network. Such a service may be for example an intrusion or cyber attack detection service, a service for filtering flows via a firewall, an address translation (or NAT for Network Address Translation) service, etc.

The invention applies in particular to denial of service (DoS) or DDoS (Distributed DoS) cyber attacks. A DoS attack may be defined as an attempt to make resources of a computing domain, such as for example network or computing resources, unavailable to their users.

DDoS attacks are becoming increasingly massive and liable to compromise several hundred thousand user equipments (fixed or mobile terminals, connected objects, servers, network resources, routers (CPE (for "Customer Premises Equipment") for example), STB (for "Set Top Box") digital decoders, service instances (or "Service Functions"), etc.), which may in turn be used as relays to amplify the harmful power of these attacks. By way of indication, the company Symantec, in its 2019 annual report, documents nearly 24000 applications embedded in mobile terminals blocked every day by such attacks, an increase of 600% between 2016 and 2017 in attacks targeting connected objects, and an increase in the volume of attack traffic between 2016 and 2017 that represented 5% of global web traffic in 2016 compared to 7.8% in 2017.

DDoS attacks are also becoming increasingly frequent and intense. They are furthermore wide-ranging, both in terms of their size (volume of traffic in the attack, amplitude of the attack, etc.) and their scope for harm (a single machine targeted, or multiple machines by targeting the local area network of a company, the network of an operator, etc.). The targets of these attacks or the relays used to propagate them are also extremely varied: fixed or mobile terminals, connected objects, servers, network resources, etc.

To protect their computing resources against such attacks, many companies subscribe to offerings from DPS (for "DDoS Protection Services") protection services. When a DPS protection service has subscribed to an access provider, it is generally present on the path taken by traffic entering and/or leaving the computing domain monitored and protected by the DPS service. The task of such a DPS service may however prove to be difficult in the event of encryption of the incoming and/or outgoing traffic. Now, there is nowadays an increase in encrypted traffic, in particular with the growing use of the QUIC transport protocol, in particular by certain commonly used applications such as browsers provided by companies such as Mozilla or Google to access websites on the Internet. This increase reflects a major concern of users who wish to ensure confidentiality of their communications and of the data exchanged during said communications.

As is known, the QUIC protocol is a protocol that is based on the UDP (User Datagram Protocol) protocol. The ambition of the QUIC protocol is in particular to reduce the latency times generally observed when establishing TCP (Transmission Control Protocol) connections (thus allowing data to be exchanged more quickly), and to allow better accommodation of the presence of intermediate entities (for example, firewalls, NATs) on the paths supporting the communications. The QUIC protocol is described for example in the IETF document by J. Iyengar et al. entitled "QUIC: A UDP-based multiplexed and secure transport", draft-ietf-quic-transport, 2019.

In accordance with the QUIC protocol, not only the payload data exchanged during communications are encrypted, but also most of the communication control information (also often referred to as a "connection" in the context of the QUIC protocol). QUIC information sent in unencrypted form is limited, as illustrated in FIG. 1, which shows the structure of a short header QUIC data packet.

Such a packet comprises a public (that is to say unencrypted) header 1 comprising three elements: a first byte 1-1 comprising various flags |0|1|S|R|C|K|P|P|, a second element 1-2 corresponding to the connection identifier (CID) allowing the packet to be routed, and a third element 1-3 containing the number of the packet. The packet also comprises an encrypted part 2, containing in particular the payload data transported by the packet, as well as various connection control information, such as for example information concerning the number of channels supported, information relating to the migration of the connection, to the change of the connection identifiers, etc.

Furthermore, with the QUIC protocol being based on the UDP transport protocol, a QUIC packet does not disclose any information useful for traffic filtering at the entrance to a computing domain, such as for example start and end of connection information, acknowledgements, etc.

It is thus difficult for a DPS service to determine whether QUIC traffic destined for a user equipment is legitimate (that is to say received with the consent of the intended recipient of a QUIC packet) or whether it is suspicious. The QUIC protocol is therefore particularly vulnerable to DDoS attacks, and in particular to reflection and identity theft attacks.

One approach to solving this problem could consist in deploying "proxies" within the networks of access providers, responsible for intercepting, in a manner transparent to users, the characteristic data of their QUIC communications and analyzing these characteristics with a view to determining whether the traffic transiting through them is legitimate (in other words, consented to by users) or suspicious (that is to say likely to be associated with a cyber attack). To this end, each proxy should maintain a connection with each of the devices involved in the communication, without however indicating this explicitly to them.

However, such an approach seems hardly viable.

Indeed, such proxies would be put in place without the knowledge of users and without their explicit consent, even though it would jeopardize the confidentiality of their communications and could compromise their personal data.

Furthermore, this approach would introduce new attack vectors, as highlighted in the article by Z. Durumeric et al. entitled "The security impact of HTTPS interception", NDSS'2017, according to which the interception of encrypted communications makes them more vulnerable to attacks.

Each proxy also has to maintain a state for each of the connections that it maintains, thereby requiring significant resources (network, CPU, etc.). It thus constitutes de facto a particularly sensitive and critical element in the event of failure (also referred to as SPOF ("Single Point of Failure")).

In addition, the devices at the origin of QUIC communications may be multi-interface (that is to say have multiple access interfaces offering them connectivity via one or more networks), and thus establish communications that take multiple paths or, on the contrary, only one path. A proxy located on one of the paths has no visibility of the global traffic associated with such a multi-interface device.

There is therefore a need for a mechanism that makes it possible to improve the security of computing domains and thereby of the communications of their users, including when these communications are based on encrypted transport protocols such as QUIC, and to do so without jeopardizing the confidentiality of these communications or compromising the personal data of the users.

DISCLOSURE OF THE INVENTION

The invention addresses this need by proposing, according to a first aspect, a method for managing communications in accordance with a given transport protocol of a first device of a network, this method being implemented by the first device and comprising, following detection of a cyber attack, a step of activating, on the first device, collaboration with at least one entity of the network in order to mitigate the cyber attack, this collaboration comprising execution, by the first device, of at least one determined action, called collaborative action, during at least one said communication of the first device in accordance with the given transport protocol, via the network.

In correlation, the invention also relates to a first device of a network, comprising an activation module, triggered following detection of a cyber attack, and configured to activate, on the first device, collaboration with at least one entity of the network in order to mitigate the cyber attack, this activation module being configured to execute, during this collaboration, at least one determined action, called collaborative action, during at least one communication of the first device in accordance with a given transport protocol, via the network.

There is no limit attached to the nature of the first device or the entity of the network.

The first device may be a user equipment (acting either as a client or as a server) such as a terminal, a server, a gateway, etc., to which the network provides connectivity, but it may also be an equipment of the actual network infrastructure, contributing to managing communications within the network, such as a router. Likewise, the entity of the network may be any equipment of the network able to be involved in managing the detected cyber attack, such as for example an equipment implementing an intrusion detection and/or attack mitigation function (for example DPS service), a firewall function, a NAT function, or even a network controller. The first device and the entity of the network may be under the responsibility of one and the same administrative entity. This is typically the implementation case within a company network.

The invention moreover preferably applies to the QUIC transport protocol, but it may also be implemented for other transport protocols for which problems similar to those mentioned above for the QUIC protocol may arise (for example no access to communication control information, no explicit consent signal in the packet, etc.).

The invention thus proposes, when a cyber attack is detected, to call upon or incite the collaboration of the devices ("first devices" within the meaning of the invention) communicating via the network with one or more entities of the network with a view to mitigating the cyber attack. All of the devices participating in a communication or only some of them may thus be called on to collaborate with the network.

This collaboration consists in executing one or more specific actions that may typically depend on the transport protocol used to establish the communications and its characteristics, these actions aiming to facilitate the task of the network entities responsible for mitigating the cyber attack, in order to distinguish legitimate traffic (that is to say consented to by the user of the device) from suspicious traffic that could be attributed to the attack.

Such actions (called collaborative actions in the remainder of the description) may be, for example, for communication in accordance with a given transport protocol:
disclosing control information relating to this communication;
freezing the migration of the communication identifiers (or connection identifiers) used during the communication; or
deactivating the use of the transport protocol in question during the communication.

These exemplary actions are preferably applied in the context of the QUIC protocol for which the control information relating to the communications is encrypted and inaccessible to the network entities. By virtue of such actions, the entities involved in mitigating the cyber attack in progress have better visibility of the global traffic destined for or transmitted by the first devices and are able, by analyzing this traffic, to determine more easily whether it is legitimate or associated with the attack, and take appropriate action accordingly.

Furthermore, highly advantageously, these actions make it possible to preserve the confidentiality of the communications, since it is at most communication control information that is disclosed or remains unchanged so as to allow the entities of the network to more easily correlate the data flows exchanged between one another with the devices at the origin or destination of these flows.

The invention, by way of collaborative actions, also offers a less radical and more effective solution in terms of performance than the one consisting in the network unilaterally blocking the use of the transport protocol under consideration. This advantageously makes it possible to preserve the consent and the interests of the users, and in particular to substantially improve the quality of the connectivity service as perceived by the user. For example, within the framework of the QUIC protocol, some services or some applications rely solely on the use of this protocol; permanent blocking of the use of the QUIC protocol by the network would lead to users being deprived of these services and applications, and would be contrary to the principle of neutrality of the Internet.

Furthermore, by virtue of the invention, devices avoid experiencing a long delay during the establishment of their communications that is linked to unilateral filtering by the network of communications in accordance with the QUIC protocol (this delay stemming from the time taken by the devices to observe the failure to establish their communications in accordance with the QUIC protocol due to the filtering performed by the network). On the contrary, within the framework of the invention, the collaborative actions are activated by the device itself, including the (temporary) deactivation of the use of the QUIC protocol.

It should moreover be noted that these exemplary actions (and more generally the actions executed by the devices within the framework of the collaboration stimulated by the invention) are not necessarily intended to assist a specific entity of the network. The first device does not have to address specific messages to a particular entity in order to collaborate according to these examples, but all or some of the network entities placed on the communication path may benefit therefrom.

These exemplary actions are of course given only by way of indication, and other actions may be contemplated as a variant, depending on the transport protocols under consideration. Furthermore, the collaboration activated in accordance with the invention may also consist in executing a combination of actions, for example disclosing the control information and freezing the migration of the communication identifiers.

The collaboration proposed by the invention therefore advantageously makes it possible to improve the effectiveness of the mitigation efforts undertaken within the network by targeting communications at risk more easily. It also makes it possible to avoid a sudden interruption of communications following the detection of a cyber attack.

Furthermore, the invention makes it possible to associate the ("first") communicating devices with the management of attacks. These are the ones that remain in control of the collaborative actions that are implemented (that is to say those that execute them during their communications), even though they may be chosen in association with the entities of the network that are involved in the mitigation of the attack or suggested thereby. The invention thus offers transparency with regard to the processing operations performed by the network.

In one particular embodiment of the invention, said at least one collaborative action is executed by the first device for a determined duration.

This duration may be defined by default, or be fixed by the network or by the first device, and if necessary be readjusted or renewed, for example for as long as the cyber attack is in progress. This thereby ensures the exceptional nature of the collaboration thus put in place, so as to preserve the interest of the users. Such a precaution allows the first device to control the information that it shares during the collaboration and to avoid abusive use of this collaboration by the network.

In one particular embodiment, the duration of execution of said at least one collaborative action is chosen to be greater than 60 minutes. Indeed, studies show that the vast majority of recent attacks have lasted more than an hour, with a small percent-age of them having lasted more than 12 hours or even more than a day.

It should be noted that it is also possible, in one particular embodiment, to limit the number of collaborations with the network that are able to be activated by the first device. For example, it is possible to contemplate allowing the activation of only one collaboration as proposed by the invention every 24 hours in order to avoid the abuse of certain networks.

In one particular embodiment, the activation step is triggered by receipt, from said at least one entity of the network, of a message proposing said collaboration.

In other words, the collaboration may be at the initiative of an entity of the network involved in mitigating the attack in progress, for example because it encounters difficulties in qualifying the traffic originating from or destined for the first device (consented-to versus suspicious).

As a variant, the collaboration may be decided on locally, on the first device, for example because this has been informed of or has detected a cyber attack, or because it has been called upon by one of its correspondents during a communication.

The implementation of the invention is therefore particularly flexible.

In one particular embodiment of the invention, the method for managing communications furthermore comprises a step of sending, to at least one second device participating in at least one said communication in accordance with said given transport protocol with said first device, an information message informing said second device of the execution, by the first device, of said at least one collaborative action.

The first device thereby informs its correspondents of the fact that it wishes or has agreed to collaborate with entities of the network for all or some of its communications, and in particular those involving the second device thus informed. The collaboration is thereby implemented in complete transparency for each of the devices involved in the communications affected by this collaboration.

The execution of said at least one collaborative action by the first device may also be conditional upon the receipt of an agreement from the second device.

It should however be noted that, depending on the contemplated collaborative actions and their execution conditions, informing the correspondents and receiving their agreement may be optional.

In one particular embodiment, the information message sent by the first device to the second device comprises at least one execution condition for said collaborative action.

Such an execution condition is for example a duration of execution of the collaborative action, or the communications or applications to which said collaborative action is applied (for example the direction in which the collaboration is applied, that is to say first device to second device and/or second device to first device), etc.

In view of the above, the invention relies, in order to implement collaboration between the communicating devices and the entities of the network, not only on the communicating devices themselves (first and second devices within the meaning of the invention), but also on the entities of the network benefiting from this collaboration.

Thus, according to a second aspect, the invention also targets a method for communication with a first device of a network, this method being implemented by a second device and comprising:

a step of receiving an information message from the first device, informing the second device of execution, by the first device, of at least one determined action during at least one communication in accordance with a given transport protocol with the second device, said action, called collaborative action, allowing collaboration with at least one entity of the network in order to mitigate a cyber attack;
  if said second device accepts the execution of said collaborative action, a step of informing the first device of its agreement.

In correlation, the invention also relates to a device, called second device, comprising a communication module for communicating with a first device of a network, this communication module being configured to:

receive an information message from this first device, informing the second device of execution, by the first device, of at least one determined action during at least one communication in accordance with a given transport protocol with the second device, said action, called collaborative action, allowing collaboration with at least one entity of said network in order to mitigate a cyber attack;

if said second device accepts the execution of said collaborative action, inform the first device of its agreement.

The communication method and the second device benefit from the same advantages mentioned above as the management method and the first device according to the invention.

In one particular embodiment of the communication method and of the management method, at least one data packet exchanged during a said communication in accordance with the given transport protocol between the first and second devices comprises at least one header indicating, in unencrypted form, at least one item of control information for this communication from among:

a state of establishment of the communication;
consent of the first or of the second device to send and/or receive data packets during this communication; and
consent or lack of consent of the first or of the second device to this communication.

This various control information provides payload data to the entities of the network that is able to be used (since it is available in unencrypted form) to improve security and mitigate the cyber attack in progress more effectively.

The presence of this control information in the headers of the packets exchanged between the first and second devices advantageously makes it possible not to increase the signaling exchanged on the network. In the context of the QUIC protocol, this information may be encoded for example in reserved fields of the short or long header of the QUIC packets. However, as a variant, this control information may be transmitted in dedicated messages, provided specifically for this purpose.

It should be noted that, conventionally, when communication is not consented to by a device, said device is generally configured to ignore this communication. Transmitting control information to the entities of the network, reflecting that communication is not consented to by a device, may make it possible to activate a function in the network responsible for filtering all of the flows relating to this communication. This may be advantageous in the case of a corrupted device that sends flows for example to other devices without its knowledge.

As mentioned above, according to a third aspect, the invention also targets a method for communication by an entity of a network with at least one device of the network, said method comprising, following an inability of said entity to determine whether or not a data flow destined for or originating from said device is associated with a cyber attack, a step of sending, by said entity to said device, a message proposing collaboration of the device in order to mitigate said cyber attack, said collaboration comprising execution, by the device, of at least one determined action, called collaborative action, during at least one communication of said device in accordance with a given transport protocol via said network.

In correlation, the invention also relates to an entity of a network, comprising a communication module, triggered by an inability of said entity to determine whether or not a data flow destined for or originating from a (first) device of the network is associated with a cyber attack, this communication module being configured to send, to said device, a message proposing collaboration of the device in order to mitigate said cyber attack, said collaboration comprising execution, by the device, of at least one determined action, called collaborative action, during at least one communication of said device in accordance with a given transport protocol via the network.

The method for communication by the entity of the network and the entity of the network benefit from the same advantages mentioned above as the management method, the first device, the method for communication by the second device and the second device according to the invention.

In one particular embodiment, the method for communication by the entity of the network furthermore comprises a step of receiving at least one item of information identifying at least one flow destined for said device and consented to thereby, or identifying at least one flow destined for said device and considered thereby to be a flow associated with a cyber attack.

This embodiment allows the first device to share, with the entity of the network, independently or not independently of its communications in progress, knowledge about the legitimate flows or, on the contrary, the suspicious flows that it possesses locally.

This information may be provided for example:

in a blocking command ("discard" or "rate-limit") to block, by way of said entity, said at least one flow considered by the device to be a flow associated with a cyber attack; or in an authorization command ("accept") to authorize routing of said at least one flow consented to by the device.

This embodiment furthermore makes it possible to easily and quickly activate mechanisms for filtering the flows of the attack upstream of the first device, at the entity of the network.

In one particular embodiment, the method for communication by the entity of the network furthermore comprises a step of sending, to said device, a request to authorize routing, to said device, of at least one data flow identified in said request.

This embodiment allows the entity of the network to request explicit consent from the first device to route thereto flows relating to its communications.

In one particular embodiment, the method for communication by the entity of the network furthermore comprises:

a step of receiving at least one data packet exchanged during said communication, comprising at least one header in which at least one item of control information for said communication from among a state of establishment of said communication, consent to send and/or receive data packets by way of said device during said communication, and consent or lack of consent by said device to said communication is indicated in unencrypted form; and a step of using said at least one item of control information to mitigate the cyber attack.

In one particular embodiment of the invention, the communication and management methods are implemented by a computer.

The invention also targets a computer program on a recording medium, this program being able to be implemented in a computer or more generally in a first device according to the invention and comprising instructions designed to implement a management method as described above.

The invention also targets a computer program on a recording medium, this program being able to be implemented in a computer or more generally in a second device according to the invention and comprising instructions designed to implement a method for communication by a second device as described above.

The invention also targets a computer program on a recording medium, this program being able to be implemented in a computer or more generally in an entity of a network according to the invention and comprising instructions designed to implement a method for communication by an entity of the network as described above.

Each of these programs may use any programming language, and be in the form of source code, object code, or of intermediate code between source code and object code, such as in a partially compiled form, or in any other desirable form.

The invention also targets a computer-readable information medium or recording medium including computer program instructions, such as mentioned above.

The information medium or recording medium may be any entity or device capable of storing the programs. For example, the medium may include a storage means, such as a ROM, for example a CD-ROM or a microelectronic circuit ROM, or else a magnetic recording means, for example a hard disk, or a flash memory.

Moreover, the information medium or recording medium may be a transmissible medium such as an electrical or optical signal, which may be routed via an electrical or optical cable, by radio link, by wireless optical link or by other means.

The program according to the invention may in particular be downloaded from a network such as the Internet.

As an alternative, the information medium or recording medium may be an integrated circuit in which a program is incorporated, the circuit being designed to execute or to be used in the execution of the communication or management methods according to the invention.

According to a fourth aspect, the invention relates to a system comprising:
  at least one first device of a network according to the invention;
  at least one second device able to communicate with the first device; and
  at least one entity of the network;
  said first device being configured to execute, following detection of a cyber attack, at least one determined action during at least one communication with the second device, so as to collaborate with said at least one entity in order to mitigate said cyber attack.

In one particular embodiment, the second device and/or the entity of the network are in accordance with the invention.

The system benefits from the same advantages mentioned above as the communication and management methods, the first and second devices and the entity of the network according to the invention.

It is also possible to contemplate, in other embodiments, the communication and management methods, the first and second devices, the entity of the network and the system according to the invention having all or some of the above-mentioned features in combination.

BRIEF DESCRIPTION OF THE DRAWINGS

Other features and advantages of the present invention will emerge from the description given below, with reference to the appended drawings, which illustrate one exemplary embodiment thereof that is in no way limiting. In the figures:

FIG. 1, already described, shows the structure of a short header QUIC data packet;

FIG. 2 shows, in its environment, a system according to the invention in one particular embodiment;

FIG. 3 schematically shows the hardware architecture of devices and of an entity of a network according to the invention, belonging to the system of FIG. 2;

FIG. 4 illustrates, in the form of a flowchart, the main steps of a communication method according to the invention, as implemented in one particular embodiment by a network entity of the system of FIG. 2;

FIG. 5 shows, in the form of a flowchart, the main steps of a method for managing communications according to the invention, as implemented in one particular embodiment by one of the devices of the system of FIG. 2;

FIG. 6 shows, in the form of a flowchart, the main steps of a communication method according to the invention, as implemented in one particular embodiment by another of the devices of the system of FIG. 2;

FIG. 7 shows one example of modifying a short header of a QUIC data packet allowing the disclosure of control information in one particular embodiment of the invention;

FIG. 8 shows examples of modifying long headers of a QUIC data packet allowing the disclosure of control information in one particular embodiment of the invention; and FIG. 9 shows two examples of the use of the control information carried by the modified QUIC data packet headers in one particular embodiment of the invention.

DESCRIPTION OF THE INVENTION

FIG. 2 shows, in its environment, a system 3 according to the invention in one particular embodiment, this system 3 making it possible to establish collaboration between one or more communicating devices and one or more entities of a communication network NW, involved in mitigating a cyber attack in progress that is targeting, or liable to affect, resources protected by said entities. This collaboration is put in place in order to manage the communications transiting via the network in accordance with a given transport protocol in order to be able to share, between the equipments (communicating devices and entities of the network), certain information for facilitating the mitigation of the cyber attack.

In the embodiment described here, the transport protocol under consideration is the QUIC transport protocol based on the UDP protocol. However, the invention of course applies to other transport protocols.

It should be noted that, for the sake of simplification, a single network NW is considered here; however, the communicating devices and/or the network entities under consideration may be connected or belong to different networks.

There is no limit attached to the nature of the communicating devices under consideration, which may be either user equipments (clients or servers, terminals, CPE (for "Customer Premises Equipment"), digital decoders (or "set top boxes"), etc.) to which the network NW provides connectivity, or equipments of the network NW. "Communicating devices" are understood here to mean devices able to establish communication with one another (also referred to below as connection in the context of the QUIC protocol). These communicating devices are distinguished here from the entities located in the actual network, being located on communication paths between communicating devices and via which the traffic exchanged between the devices communicating on these paths transits.

Likewise, there is no limit attached to the nature of the network NW, which may be a fixed or mobile network, regardless of its generation (for example 3G, 4G, 5G, 6G), etc. In the embodiment described here, it is assumed that the network NW implements the QUIC transport protocol.

There is also no limit attached to the nature of the cyber attack in progress that the system 3 is endeavoring to mitigate, nor to the computing and/or network resources targeted by this attack. It may be for example a DDoS attack as mentioned above, or an identity theft, ransomware, etc. attack, which may impact any type of resources such as computing or memory resources, network resources (for example IP addresses, domain names, IP prefixes, etc.), interconnection links with other networks, etc.

In the example contemplated in FIG. 2, the system 3, in order to mitigate a cyber attack ATTACK in progress detected by the network NW (either directly thereby or via an entity external to the network NW), relies on two communicating devices 4 and 5 and an entity 6 of the network, the entity 6 of the network here offering a DPS service for protecting against cyber attacks and protecting the resources of the network NW. It should be noted that the cyber attack ATTACK does not necessarily directly target resources of the network NW that are protected by the DPS entity 6 or the communicating devices 4 and 5. As mentioned above, the resources targeted by the cyber attack ATTACK may be of any kind: equipments connected to the devices 4 and 5 if these are CPEs for example, applications embedded in the devices 4 and 5, all or some of the resources protected by the DPS entity 6, etc. It may be the case for example that the resources protected by the DPS entity 6 and/or the devices 4 and 5 are not directly targets of the attack, but serve as a relay therefor, or make it possible to reach the targets of the attack.

It should furthermore be noted that the invention applies to other entities 6 of the network that are able to implement functions other than a function of protecting against cyber attacks, and playing a direct or indirect role in the mitigation of a cyber attack in progress. The invention applies in general to any entity located in the network NW, and configured to perform processing operations on the traffic routed via this network, such as mitigation, filtering (for example firewall) or even traffic classification (for example PCEF (Policy and Charging Enforcement Function)), etc. processing operations.

In the embodiment described here, the devices 4 and 5 and the entity 6 of the network are all in accordance with the invention, and have the hardware architecture of a computer 7, as shown schematically in FIG. 3. The devices 4 and 5 are configured here to act sometimes as a first and, respectively, as a second device within the meaning of the invention. It should be noted that they may act in this way depending on whether they are at the origin of the establishment of a communication and/or the intended recipient of a communication.

The devices 4 and 5 and the entity 6 of the network comprise in particular a processor 8, a random access memory 9, a read-only memory 10, a non-volatile memory 11, and communication means 12 allowing them in particular to communicate with one another. These communication means 12 are based on a wired or wireless communication interface, which is known per se and not described in more detail here. Furthermore, in the embodiment described here, the communication means 12 are configured to implement the QUIC transport protocol, and to transmit and receive data flows in accordance with the QUIC protocol. Each flow comprises one or more QUIC data packets, each QUIC packet itself possibly comprising one or more QUIC frames. A QUIC frame may be a control frame (for example CONNECTION_CLOSE frame used to close a QUIC connection) or a data frame (for example STREAM frame).

The read-only memory 10 of the computer 7 constitutes a recording medium according to the invention, able to be read by the processor 8 and on which one or more computer programs according to the invention is or are recorded.

More specifically, the read-only memory 10 of each of the devices 4 and 5 comprises a recording of two computer programs PROG4 and PROG5.

The program PROG4 defines functional modules of a first device within the meaning of the invention that rely on or control the abovementioned hardware elements 8 to 12 of the computer 7. These modules, triggered following the detection of the cyber attack ATTACK, comprise in particular, in the embodiment described here (see FIG. 2):

an activation module 4A, configured to activate, on the first device, collaboration with at least one entity of the network NW (and in particular with the DPS entity 6) in order to mitigate the cyber attack ATTACK. This activation module 4A is configured to execute, during this collaboration, at least one determined action, called collaborative action, during at least one communication of the first device in accordance with a given transport protocol (QUIC in the example under consideration here) via the network NW;

a transmission/reception module 4B, configured to transmit and receive messages to and from other communicating devices of the network NW. Such messages are described in more detail below.

The program PROG5 defines functional modules of a second device within the meaning of the invention that rely on or control the abovementioned hardware elements 8 to 12 of the computer 7. These modules, triggered following the detection of the cyber attack ATTACK, comprise in particular in the embodiment described here (cf. FIG. 2) a transmission/reception (or more generally communication) module 5A configured to:

receive an information message from another communicating device (first device within the meaning of the invention), informing the second device of execution, by the first device, of at least one determined collaborative action during at least one communication in accordance with a given transport protocol (QUIC in the example contemplated here) with the second device; and if said second device accepts the execution of this collaborative action, inform the first device of its agreement.

It should be noted that each of the devices 4 and 5 may in turn be a first and a second device within the meaning of the invention, the transmission/reception modules 4B and 5A may be grouped together within a single module duly configured to perform the functions of each of the modules 4B and 5A.

The read-only memory 10 of the DPS entity 6 comprises a recording of a computer program PROG6. This program PROG6 defines functional modules of the DPS entity 6 that rely on or control the abovementioned hardware elements 8 to 12 of the computer 7. These modules, triggered following the detection of the cyber attack ATTACK, comprise in particular, in the embodiment described here (see FIG. 2):

a cyber attack detection module 6A for detecting cyber attacks targeting re-sources protected by the DPS entity 6. This module 6A is equipped with means for analyzing the traffic transiting via the DPS entity 6 and the information fed back thereto, where applicable, by third-party equipments connected to the network NW and/or external to the network NW;

a cyber attack mitigation module 6B for mitigating the cyber attacks detected by the module 6A; and a communication module 6C, triggered here upon detection of an inability of the DPS entity 6 and in particular of its module 6A to determine whether or not a data flow destned for or originating from a device of the network NW is associated with a cyber attack that it has detected (for example here with the cyber attack ATTACK), this communication module being configured to send, to the device, a message proposing thereto collaboration in order to mitigate said cyber attack, this collaboration comprising execution, by the device, of at least one determined collaborative action, during at least one communication of the device in accordance with a given transport protocol (QUIC protocol in the example con-templated here), via the network NW.

A description will now be given, with reference to FIGS. 4 to 6, of how the collaboration between the devices 4 and 5 and the DPS entity 6 of the network is implemented in the embodiment described here with a view to mitigating a cyber attack in progress (that is to say attempting to handle it and to absorb it or at the very least to reduce its consequences), specifically here the cyber attack ATTACK. FIG. 4 shows the main steps of a communication method according to the invention as implemented, in the embodiment described here, by the DPS entity 6 of the network NW. FIG. 5 shows the main steps of a method for managing communications according to the invention as implemented, in the embodiment described here, by the communicating device 4 during its communications in particular with the communicating device 5. FIG. 6 shows the main steps of a communication method according to the invention as implemented, in the embodiment described here, by the communicating device 5.

There is no limit attached to the way in which the cyber attack ATTACK is detected (by the DPS entity 6 directly, by an entity external to the network NW that informs the DPS entity 6 thereof, by a communicating device, etc.) or to which resources it tar-gets. It is assumed here that it is likely to affect resources protected by the DPS entity 6 (directly or indirectly, as mentioned above, by using the resources protected by the DPS entity 6 as an attack relay or to reach other resources) and thus triggers an intervention therefrom with a view to mitigating it.

In the example contemplated here, with reference to FIG. 4, following the detection of the cyber attack ATTACK (step E10), the DPS entity 6 analyzes, via its module 6A, the traffic exchanged via the network NW and transiting via it (step E20). It is assumed in particular here that the DPS entity 6 is located in the network NW on a path taken by the communications of the device 4, these communications being established here in accordance with the QUIC transport protocol as mentioned above. There is no limit attached to the nature of these communications: they may be voice, multimedia data transfer, etc. communications that are unilateral or bilateral. These communications result in the device 4 sending and/or receiving data flows via the network NW, each data flow comprising a set of QUIC data packets. In accordance with the QUIC protocol, these data packets are encrypted: the QUIC protocol as defined by the IETF encrypts not only the payload data contained in these packets, but also the connection control information (or communication control information, a connection referring to a communication in accordance with the QUIC protocol), with the exception of a small amount of said information (for example connection identifiers), as already commented upon with reference to FIG. 1.

The DPS entity 6 therefore continuously analyzes here, via its module 6A, the traffic (that is to say the data flows) destined for the device 4 and originating from the device 4 (hereinafter qualified as "associated with the device 4" for the sake of simplification), in order to determine whether or not it is affected by the cyber attack ATTACK (test step E30). It does this in a manner known per se, for example by examining whether this traffic comes from a known target of the attack, whether it exhibits suspicious features (for example exceedance of the capacity of a local link, number of connections allocated to the device 4 over a given period greater than the average usually observed over this period or greater than a threshold, number of "embryonic" connections to the device 4 greater than a threshold, an embryonic connection corresponding to a connection initialized by a remote communicating device without completing the sending of the messages needed to confirm the connection, the thresholds under consideration being fixed based on knowledge of the attack ATTACK), etc. It should be noted that, during this analysis, the module 6A of the DPS entity 6 relies on statistics that it evaluates, or receives from other entities able to collect these statistics, based on "public" data that it possesses about the traffic associated with the device 4. It relies for example on the connection (or communication) identifiers conveyed in unencrypted form in the QUIC data packets destined for or originating from the device 4, on the traffic statistics collected by counters associated with the activation of the SNMP (Simple Network Management Protocol) protocol used to manage a device, a network, on the traffic statistics provided by the counters associated with the activation of the NETCONF (NETwork CONFiguration) protocol, etc.

If, during this analysis, the DPS entity 6 is able to qualify the traffic, that is to say to decide whether or not it is associated with the attack (response "yes" in test step E30), the DPS entity 6 processes the traffic appropriately according to this qualification (step E40). Thus:

if it determines that the traffic is associated with the attack ATTACK, it triggers, via its mitigation module 6B, one or more actions to mitigate the cyber attack ATTACK. Such mitigation actions are known per se, and of course depend on the nature of the cyber attack ATTACK, its extent, the way in which the traffic associated with the device 4 is infected, etc. Such actions may consist for example in blocking attack traffic ("discard"), notifying other entities of the network NW for the purpose of redirecting legitimate traffic, dynamically setting up traffic sinks intended to destroy packets characteristic of attack traffic, setting up "honeypots" intended to attract attack traffic in order to redirect it more easily to a traffic sink or to compile an "abuse" file with the competent authorities (context of identity theft in particular), etc.;

if it determines that the traffic is legitimate ("clean"), it routes this traffic to its intended recipient.

It is assumed that, at a given time during this analysis, the DPS entity 6 detects that it does not have the information needed to determine whether or not the traffic originating from or destined for the device 4 is associated with the cyber attack ATTACK (response "no" in test step E30). For example, this traffic exhibits suspicious features as described above, but the DPS entity 6 is not able, based on these features, to decide whether it is "legitimate" traffic or whether it is associated with the cyber attack ATTACK.

According to the invention, the DPS entity 6 then calls upon the device 4 to switch to a collaborative mode (step E50). For this purpose, in the embodiment described here, the DPS entity 6, via its communication module 6C, sends, to the device 4, a message proposing collaboration thereof in order to mitigate the cyber attack ATTACK (step E60). This collaboration consists, according to the invention, in the device 4 executing one or more determined actions, called collaborative actions.

More specifically, in the example contemplated here, the message sent by the DPS entity 6 to the device 4 is a QUIC control frame, here for example called COMIT (for "COllaborative MITigation"), and comprising the following elements:

- a "Lifetime" parameter indicating the duration of the collaboration proposed by the DPS entity 6; at the end of this deadline, the collaboration may be deactivated automatically by the device 4. It is assumed here that a default value is defined for this parameter on each device 4 (for example a value greater than or equal to 60 minutes), so that, if no value of the "Lifetime" parameter is indicated explicitly in the COMIT frame, the duration of the collaboration considered by the device 4 is fixed to be at least equal to this default value;
- a "Strategy_ID" parameter indicating the one or more collaborative actions that the DPS entity 6 proposes to the device 4 to execute in order to assist it with mitigating the cyber attack ATTACK. These actions may be of various kinds and comprise in particular disclosing communication control information of the device 4, deactivating the use of the encrypted transport protocol (QUIC here), or even freezing the migration of the communication identifiers during communications of the device 4 (so that the DPS entity 6 is able to more easily associate the data flows with one and the same communication, etc.). Thus, for example, the "Strategy_ID" parameter may take the following values in the context of the QUIC protocol:
  - 0x0: designates the disclosure of communication (connection) control in-formation;
  - 0x1: designates the deactivation of the QUIC transport protocol during communications;
  - 0x2: designates the freezing of connection identifiers (CID) during communications;
  - 0x3: designates the freezing of connection identifiers and communication control information.
- Of course, this list of actions is not exhaustive, and other actions may be contemplated. It is also possible to contemplate a plurality of collaborative actions proposed by the DPS entity 6 of the network (cf. code 0x3 in the example given above). It may furthermore be considered that, in the absence of an explicit "Strategy_ID" parameter contained in the COMIT frame, one or more default collaborative actions are intended to be applied by the device 4, specifically for example the actions corresponding to the code 0x3 here.

With reference to FIG. 5, upon receipt of the COMIT frame (step F10), the device 4 has, in the embodiment described here, the option to accept or decline the collaboration requested by the DPS entity 6 (test step F20). Even if the collaboration is at the initiative of the DPS entity 6, the device 4 is thereby advantageously left free to decline the collaborative actions that the DPS entity asks it to execute.

However, in another embodiment, it is possible to contemplate the COMIT frame having the consequence of activating the collaboration on the device 4, without requiring explicit agreement thereof.

If the device 4 declines the collaboration (response "no" in test step F20), it informs the DPS entity 6 thereof or ignores the message (step F30).

If the device 4 accepts the collaboration (response "yes" in test step F20), the device 4 saves the information contained in the COMIT frame (address of the DPS entity 6, duration of the collaboration, actions, etc.) in its non-volatile memory for example, and sends a collaboration confirmation message to the DPS entity 6 (step F40). The collaboration is then activated within the device 4 via its activation module 4A for a minimum duration equal to the duration indicated in the "Lifetime" parameter. It should be noted that, if necessary, this duration may be renewed, for example at the initiative of the DPS entity 6 if the cyber attack ATTACK is not absorbed upon expiry of the "Lifetime" duration.

As a variant, the COMIT frame does not contain a "Lifetime" parameter, no default value is defined, and the collaboration may be activated for an indefinite duration until receipt of a message ending this collaboration from the DPS entity 6.

The activation of the collaboration on the device 4 results in the device 4 executing the collaborative actions proposed by the DPS entity 6 in the COMIT frame.

The device 4 may furthermore also, during this collaboration, call upon the DPS entity 6 or another entity of the network NW, to inform it of the data flows to which it consents and/or the data flows that it considers to be suspicious, in other words associated with a cyber attack and in particular with the cyber attack ATTACK, given the local knowledge that it possesses about its communications. This may take place outside of any communication established by the device 4.

For this purpose, in the embodiment described here, the device 4 sends, to the DPS entity 6, a message comprising information identifying at least one flow destined for the device 4 and consented to thereby, or identifying at least one flow destined for the device 4 and considered thereby to be a flow associated with a cyber attack. This message here takes the form of one of the following commands, each command being able for example to be associated with a dedicated QUIC control frame:

- a command, called "DISCARD_ALL", for blocking (filtering), by way of the DPS entity 6, all incoming communications to the device 4;
- a command, called "DISCARD_ALL/Except: ACCEPT_LIST(FLOW_ID)", for blocking (filtering), by way of the DPS entity 6, all incoming communications to the device 4 except those identified by the data flow identifiers FLOW_ID provided in the list ACCEPT_LIST(FLOW_ID). The data flow identifiers may be populated with connection identifiers (CID) or other information for identifying the data flows in question, such as source address, source port, etc.;
- a command, called "ACCEPT_ALL", for authorizing routing, by the DPS entity 6, of all active incoming communications to the device 4;
- a command, called "ACCEPT_ALL/Except: DISCARD_LIST(FLOW_ID)", for authorizing routing, by the DPS entity 6, of all active incoming communications to the device 4 except those identified by the data flow identifiers FLOW_ID provided in the list "DISCARD_LIST(FLOW_ID)".

In another embodiment, the DPS entity 6 may itself call upon the device 4 to ask its explicit authorization to route one or more communications (or, similarly, one or more data flows) thereto. For this purpose, it may send to it for example a message in the form of a QUIC control frame, called CONSENT_CHECK here, comprising the following parameters:

- a "FLOW_ID" parameter, indicating the identifier of at least one communication (or connection), this identifier possibly being, as indicated above, a connection identifier, a source address, a source port, etc.;
- a "Magic Nonce" parameter comprising a randomly generated identifier whose purpose is to allow the DPS entity 6 to correlate the CONSENT_CHECK frame with the response to this frame sent by the device 4.

Regardless of the variant that is implemented ("DISCARD/ACCEPT" commands or CONSENT_CHECK message), the DPS entity 6 stores, in its non-volatile memory, the filtering or routing rules agreed with the device 4, and applies them from then on to the incoming communications destined for the device 4.

A description will now be given of how the device 4 executes the one or more collaborative actions requested by the DPS entity 6 and as described in the COMIT frame in the embodiment contemplated here. These actions may be executed within the frame-work of active or future QUIC communications of the device 4 with other communicating devices, and rely on the sending of QUIC packets during these communications containing information likely to assist the DPS entity 6 with mitigating the cyber attack ATTACK.

As a variant or in addition, this information may be sent by the device 4 to the DPS entity 6 outside of the communications of the device 4 in accordance with the QUIC protocol, via dedicated messages (or QUIC frames) provided for this purpose. These messages may be destined for the DPS entity 6 or be broadcast in the network on a predetermined address provided for this purpose, and shared for example by the entities involved in the security of the network NW (for example an IP multicast address reserved for this purpose and corresponding to a multicast group to which the entities of the network NW in question have subscribed).

Such precautions allow the device 4 to control the information that it shares with the network and to avoid abusive use thereby of the information disclosed thereto over a limited duration.

The collaborative actions may be executed by the device 4 during all or some of its communications. The device 4 may thus, in one embodiment, decide on the communications to which it decides to apply the collaborative actions.

In the embodiment described here, prior to the execution of the collaborative actions, a negotiation phase is implemented between the device 4, which has agreed to collaborate with the DPS entity 6 of the network NW, and its correspondents, in other words the devices with which it has established communications during which it plans to execute the collaborative actions (step F50). The execution of the collaborative actions by the device 4 is conditional here upon the success of this negotiation phase (response "yes" in test step F60): in other words, the collaborative actions are executed by the device 4 during its communications only if they are approved by its correspondents or under conditions approved by its correspondents. As a result, it may be the case that the device 4 applies the collaborative actions with only some of its correspondents.

It is assumed for example here that such a negotiation phase is implemented by the device 4 with the device 5. FIG. 6 shows the main steps implemented by the device 5 during this negotiation phase. These steps are executed within the framework of the communication method according to the invention implemented by the device 5.

More specifically, in the embodiment described here, during the negotiation phase, the device 4 sends a message to the device 5, informing it of the execution of one or more collaborative actions during its communications with the device 5. This information message is received by the device 5 via its transmission/reception module 5A. It takes the form here of a QUIC frame, encrypted in accordance with the principles of the QUIC protocol. In the embodiment described here, the information message sent by the device 4 depends on the collaborative action executed by the device 4 (a distinct frame depending on the action), and comprises one or more execution conditions for the collaborative action.

Thus, for example, if the collaborative action executed by the device 4 is the disclosure of control information about the communications of the device 4, the information message sent by the device 4 is a QUIC frame, called CONTROL_REVEAL here and comprising in particular the following parameters to specify the execution conditions for the disclosure of the control information:

- a "Lifetime" parameter, indicating, as in the COMIT frame, the duration of the collaboration put in place by the device 4. If no "Lifetime" parameter is set in the CONTROL_REVEAL frame, it is possible to contemplate a default value, for example greater than or equal to 60 minutes, being applied by the device 4; and
- a "Direction" parameter indicating the direction of the communication affected by the collaborative action implemented by the device 4. For example, this parameter may take the following values:
    - 0x0: only the data packets sent by the device 4 are affected by the disclosure of the control information;
    - 0x1: only the data packets sent by the remote device 5 are affected by the disclosure of the control information;
    - 0x2: all of the data packets sent by the device 4 and by the device 5 are affected by the disclosure of the control information. In the absence of a value specified in the CONTROL_REVEAL frame for the "Direction" parameter, it is considered here that this is the option applied by default.

Of course, these parameters are given only by way of illustration, and other execution conditions may be specified. For example, only packets sharing one and the same given destination address, one and the same given source address, one and the same source or destination port number or a combination of these criteria and sent by the device 4 (or, respectively, the device 5) are affected by the disclosure of the control information, etc.

The device 5 may then accept or decline (for example by ignoring the CONTROL_REVEAL message, step G40) the collaboration put in place by the device 4 (test step G20). As a variant, negotiation of one or more execution conditions for the collaborative action may be triggered between the two devices. The acceptance or declining of the collaboration ends the negotiation phase.

It is assumed here that the device 5 accepts the collaboration (response "yes" in test step G20 and response "yes" in step F60) and the execution of the collaborative action consisting in disclosing the control information for its communications with the device 4. The device 5 then sends, to the device 4, an acknowledgement message to inform it of its agreement (step G30). The acknowledgement message is received by the device 4 via its transmission/reception module 4B.

It should be noted that the two devices 4 and 5 may be called upon independently to collaborate by the DPS entity 6 or by distinct entities of the network NW, or even, if they belong to different networks, by distinct entities of their respective networks. The devices 4 and 5 may then both respectively send each other QUIC CONTROL_REVEAL frames by way of one and the same communication if, for example, they have respectively accepted such collaboration.

The negotiation phase that has just been described is performed for the existing QUIC communications (or connections) of the device 4, in other words for the communications that have already been established. A similar negotiation phase may also be carried out for future QUIC communications of the device 4 (that is to say those to be established after a trigger event has been received/detected).

For this purpose, when the device 4 sends a request to establish a QUIC communication to a remote device (for example to the device 5), it uses a QUIC frame in which the communication control information is disclosed. It also sends, during this establishment request, a CONTROL_REVEAL frame to inform the device 5 of the execution conditions for the collaborative actions (for example duration, direction). The processing of the CONTROL_REVEAL frame by the device 5 is identical to what has been described above for the communications in progress. It should therefore be noted that, for the processing of future communications, the negotiation comes second, and does not oppose the disclosure of the communication control information in the communication establishment request.

When the negotiation phase results in acceptance of the collaboration by the remote device (device 5 in the above examples), the device 4 may therefore continue to disclose, during its communications with the device 5, the control information relating to these communications, for the duration defined by the "Lifetime" parameter, and in accordance with the execution conditions negotiated with the device 5 (step F70 in FIG. 5).

In the embodiment described here, the communication control information is disclosed in the public header of the QUIC data packets sent and/or received by the device 4. A function located in the network NW via which these QUIC data packets transit (typically, in the example contemplated here, the DPS entity 6) is thereby able to access the control information disclosed by the device 4 (and/or by its correspondents).

More specifically, in the embodiment described here, the inventors propose to modify the public part of the headers of the QUIC packets as defined at present in the QUIC protocol so as to indicate communication control information explicitly and in unencrypted form. Such information is for example:
- a state of establishment of the communication;
- consent to send and/or receive data packets during the communication by one and/or the other of the devices involved in the communication (devices 4 and 5 in the example contemplated here); and
- consent or lack of consent to said communication by one and/or the other of the devices involved in the communication (devices 4 and 5 in the example contemplated here).

FIG. 7 illustrates one example of such a modification for a short header of a QUIC packet. In this example, the (reserved) flag C of the first byte of the short header (cf. byte 1-1 shown in FIG. 1) is set to "1" to indicate that the QUIC packet contains a new field, called "Public Control Status" here, reflecting various communication control information (in the current prior art, the reserved flag C is generally set to 0; if it is set to 1, it is ignored). The "Public Control Status" field may be populated for example with the following values:
- 0x0: to indicate that the communication (or connection) is currently being established;
- 0x1: to indicate the consent of the device 4 to receive data packets from the remote device (device 5 in the example contemplated here);
- 0x2: to indicate the consent of the device 4 to send and receive data packets;
- 0x3: to indicate communication established with mutual consent of the devices 4 and 5; and
- 0x4: to indicate communication not consented to.

It should be noted that, in the prior art, communication not consented to by a device is generally ignored thereby. On the contrary, the inventors propose to use this information advantageously and to bring it to the attention of one or more functions of the network NW (for example here of the DPS entity 6), which may then take responsibility for filtering all of the flows relating to this communication not consented to by the device 4 (or even relating to all of the communications established with the remote device 5).

Other values may of course be contemplated as a variant to provide other communication control information to the entities of the network involved in mitigating the cyber attack ATTACK. It should however be noted that it does not appear useful to disclose the communication control substates such as for example the creation or the closure of a new channel or STREAM, the retransmission of QUIC packets, etc., this information not being able to be used a priori by such network entities.

A modification of the long headers to include a new "Public Control Status" field may also be contemplated as a variant, as illustrated by FIG. 8. This field is set to "0x0" for the packets Initial (illustrated by FIG. 8B) and 0-RTT (illustrated by FIG. 8A). The advantage of this variant is that of allowing the network function to detect, in advance, the connections established in a collaborative mode. Said function may thus store the identifiers CID (Source and Destination) in memory in order to facilitate the correlation of the transmitted packets with the received packets characteristic of one and the same QUIC communication.

It should be noted that, in order to avoid using the collaboration put in place between the device 4 and the DPS entity 6 to introduce reflection attacks into the network NW, it is possible to configure the communicating devices involved in a communication transiting via the DPS entity 6 so that they do not send more than three QUIC packets disclosing the control information for this communication.

FIG. 9 shows exemplary uses, by an entity of the network, for example here by the DPS entity 6, of the control information disclosed in the headers of the QUIC packets exchanged between the devices 4 and 5, to mitigate a cyber attack.

With reference to FIG. 9A, consented-to collaborative communication, at the origin of the device 4, is characterized by the observation, by the DPS entity 6, of the following elements:

Sending (QUIC1) of a QUIC communication initialization message from the device 4 to the device 5: in this message, the flag C is set to 1 and the "Public Control Status" field (or PCS in the figure) is set to PCS=0x0

(or 0). The connection identifier of the device 4 (SCID or Source CID) is set to Val4 and that of the remote device 5 (DCID) to 0;

Sending (QUIC2) of a QUIC message by the device 5 to the device 4 in which the flag C is set to 1 and the "Public Control Status" field is set to PCS=0x1 (reflecting sending or reception consent information);

Sending (QUIC3) of a QUIC message by the device 4 to the device 5 in which the flag C is set to 1 and the "Public Control Status" field is set to PCS=0x2 (reflecting packet sending and reception consent information);

Sending (QUIC4) and (QUIC5) of QUIC messages by the device 5 to the device 4, and by the device 4 to the device 5, in which the flag C is set to 1 and the "Public Control Status" field is set to PCS=0x03 (reflecting communication established with mutual consent).

A similar exchange may be described for communication established at the initiative of the device 5.

The DPS entity 6, placed on the path of the exchanges taking place between the devices 4 and 5, is able to detect an anomaly in the traffic destined for or originating from the device 4 if the consent message (corresponding to the "Public Control Status" field set to 0x3) is not exchanged between the two devices, or if the device 4 has not explicitly indicated its consent to receive traffic as part of communication established with the device 5.

If such an anomaly is detected, the DPS entity 6 may decide to redirect the data packets of said communication to a scrubbing center for processing these data packets or to block these data packets.

According to another example illustrated in FIG. 9B, the device 4 may send, after having received various data packets from the device 5 (sending (QUIC6) and (QUIC7)), a QUIC message with the "Public Control Status" field set to PCS=0x4 (sending (QUIC8)). This message is intercepted by the DPS entity 6, which extracts the communication control information therefrom before deleting the message. All of the packets of this communication, or even the packets of all of the communications received from the device 5, are then blocked by the DPS entity 6 and rejected (rejections of the sending (QUIC9) and (QUIC10)). These filters may be removed following the expiry of a specific deadline. It should be noted that, preferably, the message intercepted by the DPS entity 6 is not routed to the device 5 in order to avoid said device using it to alter its attack strategy.

With regard to these two examples, it is clearly apparent that the disclosure of control information within the framework of the QUIC protocol advantageously allows the DPS entity 6 to better differentiate the traffic consented to by the device 4 from the traffic of the attack, and to take appropriate and effective actions with a view to mitigating the attack.

As mentioned above, in addition to the disclosure of communication control information, the DPS entity 6 may propose other collaborative actions to the device 4 (and where applicable to the device 5), and in particular to freeze the migration of the communication identifiers during communications established by the device 4 (corresponding to the "Strategy_ID" parameter set to 0x2 in the COMIT frame transmitted by the DPS entity 6 to the device 4).

For this action as well, it is possible to contemplate implementing a phase of negotiation between the devices 4 and 5 following the acceptance, by the device 4, of the collaboration proposed by the DPS entity 6.

In a manner known per se, the QUIC protocol offers communicating devices the possibility of changing, during their communications, the communication identifiers (more commonly referred to as connection identifiers or CID in the context of the QUIC protocol) that they use to characterize said communications. This change, also known as "migration of connection identifiers", is conventionally performed via the exchange of QUIC frames provided for this purpose and the content of which is encrypted, in particular the connection identifiers to which the communication is intended to migrate such that it is not possible for the network entities to make the link between the new connection identifiers of a communication used after migration by the communicating devices and the previous connection identifiers used before migration. The invention offers the possibility of freezing the migration of the connection identifiers relating to a communication for a determined duration, which may be equal to the value of the "Lifetime" parameter provided in the COMIT frame or, as a variant, correspond to the time that the communication will last.

By maintaining the same connection identifiers for the duration of the QUIC communication, the classification, by a network function such as the DPS entity 6, of the data packets characteristic of this communication is simplified, since this makes it possible to correlate the packets sent with the packets received during one and the same communication. One and the same communication is thus uniquely identified while one or more mitigation actions is/are in progress. The analysis of the packets by the DPS entity 6 to determine whether they belong to traffic consented to by the device 4 or to attack traffic is thereby greatly simplified.

As for the disclosure of the control information, prior to the application of the freezing of the migration of the connection identifiers relating to its communications in progress, the device 4 may initiate a phase of negotiation with its correspondents, and in particular here with the device 5 (step F50 FIG. 5, steps G10 and G20 FIG. 6).

For this purpose, the device 4 sends, to the device 5, a message informing it of the freezing of the connection identifiers that it plans to execute. This message takes the form here of an encrypted QUIC frame called FREEZE_CID and comprising in particular a "Lifetime" parameter indicating the duration for which the device 4 plans to maintain a unique connection identifier CID during its communication with the device 5. Preferably, the "Lifetime" duration is chosen such that the connection identifier CID remains the same throughout the communication (it should be noted that, as a result, the "Lifetime" duration for maintaining the connection identifier CID does not necessarily correspond to the duration of activation of the collaboration provided by the DPS entity 6 in the COMIT message. It may in particular be less than the duration provided in the COMIT message).

As a variant, the FREEZE_CID frame may contain other parameters. Thus, in a manner known to those skilled in the art, a connection identifier CID comprises two parts, a source connection identifier or SCID and a destination connection identifier or DCID. The FREEZE_CID frame may indicate, as execution condition, the part to which the maintenance recommended by the collaborative action applies.

At the end of the "Lifetime" duration, the collaboration is automatically deactivated on the device 4. The device 4 may then generate, if it wishes, new connection identifiers and migrate connection identifiers using the known QUIC frames NEW_CONNECTION_ID and RETIRE_CONNECTION_ID, in accordance with the conventional QUIC protocol mechanism known to those skilled in the art.

The remote device 5 may accept (response "yes" in test step G20) or, respectively, decline (response "no" in the test step G20), the freezing of the connection identifiers by responding with an acknowledgement message ACK (step G30), or, respectively, by ignoring the FREEZE_CID message (step G40).

Once the negotiation phase has been successfully completed, the two devices 4 and 5 maintain one and only one connection identifier CID, formed here of a connection identifier generated by the device 4 and a connection identifier generated by the device 5 (serving alternately as SCID and DCID depending on the direction of the messages exchanged during the communication) (steps G50 and F70).

It should be noted that a negotiation phase similar or identical to those that have just been described for collaborative actions such as disclosing control information and freezing connection identifiers may also be implemented when the DPS entity 6 proposes, in its COMIT message, a combination of multiple collaborative actions (for example, "Strategy_ID" parameter set to 0x3 to request freezing of the connection identifiers and disclosure of control information). In this case, the remote device 5, during the negotiation phase, may accept or decline one or more of these collaborative actions.

As mentioned above, another possible collaborative action may consist, for the device 4, in deactivating the QUIC transport protocol in order to establish its communications and in using a transport protocol other than QUIC, such as for example the TCP transport protocol, to establish its future communications (that is to say those to be established after a trigger event has been received/detected). As for the other collaborative actions, a prior negotiation may be put in place between the device 4 and its correspondents in order to ensure that said correspondents accept the deactivation of the QUIC protocol.

Following acceptance of the collaboration proposed by the DPS entity 6, and where applicable, if its correspondents agree, the device 4 uses the TCP protocol to establish its new communications, as long as the collaboration is active. At the end of the collaboration (in other words of the "Lifetime" duration), the device 4 may reuse the QUIC protocol to establish its communications with its correspondents.

The collaborative actions that have just been mentioned are not limiting per se. They are preferably applied within the framework of the QUIC protocol, but are however not limited to this protocol. Moreover, other collaborative actions may of course be contemplated, as a variant or in addition to those that have just been cited and described.

Furthermore, in the embodiment described here, the triggering of the collaboration of the device 4 with the network NW, and more particularly with the DPS entity 6, is at the initiative of the DPS entity 6. As a variant, the collaboration may be triggered by the device 4 itself. In this case, the device 4 does not receive an explicit message from the network, but relies on events that it has observed locally (for example the detection of an attack) or that are reported thereto by a remote device or a third-party entity (external or not external to the network).

In this embodiment, the collaboration then concerns, by default, all of the QUIC communications of the device 4 via the network NW. The device 4 may however decide at any time to activate this collaboration only for a subset of its communications, for example according to the nature of the events reported by its correspondents or by the network used to route the data of a communication.

It should moreover be noted that, in the embodiment described here, the device 4 is connected only to a single network NW and is called upon only by a single network function, specifically the DPS entity 6. As a variant, one and the same device may be connected to multiple distinct networks and decide to activate collaboration with one or more distinct entities of these networks.

The invention claimed is:

1. A management method for managing communications in accordance with a given transport protocol of a first device of a network, said method being implemented by the first device and comprising:
    following detection of a cyber attack, activating, on said first device, collaboration with at least one entity of said network in order to mitigate said cyber attack, said collaboration comprising execution, by said first device, of at least one determined action, called a collaborative action, during a communication of said first device with a second device distinct from said at least one entity, said communication being in accordance with said given transport protocol and being routed via said network; and
    sending, to the second device, an information message informing said second device of the execution by the first device of said at least one collaborative action during the communication, the information message further comprising at least one condition respected by the execution of the collaborative action during the communication.

2. The management method as claimed in claim 1, wherein said activating is triggered by receipt, from said at least one entity of the network, of a message proposing said collaboration.

3. The management method as claimed in claim 1, wherein at least one data packet exchanged during a said communication in accordance with said given transport protocol comprises at least one header indicating, in unencrypted form, at least one item of control information for said communication from among:
    a state of establishment of said communication;
    consent to send and/or receive data packets during said communication; and
    consent or lack of consent to said communication.

4. The management method as claimed in claim 1, wherein said at least one collaborative action comprises:
    disclosing encrypted control information for said at least one communication; and/or
    freezing migration of communication identifiers used during said at least one communication; or
    deactivating use of said given transport protocol by said first device during said at least one communication.

5. The management method as claimed in claim 1, wherein said at least one collaborative action is executed for a determined duration.

6. The management method as claimed in claim 1, wherein said given transport protocol is the QUIC protocol.

7. The management method as claimed in claim 1, wherein the first device is a user equipment to which the network provides connectivity.

8. The management method as claimed in claim 1, comprising choosing the collaborative action executed by the first device during the at least one communication to facilitate the task of network entities responsible for mitigating the cyber attack in order to distinguish legitimate traffic from suspicious traffic attributed to the cyber attack.

9. A communication method for communication with a first device of a network, said method being implemented by a second device and comprising:
    receiving an information message from the first device, informing the second device of execution, by the first device, of at least one determined action during a communication with the second device, said communication being in accordance with a given transport protocol and being routed via said network, said action, called a collaborative action, allowing collaboration with at least one entity of the network in order to mitigate a cyber attack, wherein the information message further comprises at least one condition respected by the execution of the collaborative action during the communication; and in response to said second device accepting the execution of said collaborative action, informing the first device of an agreement.

10. The communication method as claimed in claim 9, wherein said at least one collaborative action comprises:
disclosing control information for said at least one communication; and/or
freezing migration of communication identifiers used during said at least one communication; or
deactivating use of said given transport protocol by said first device during said at least one communication.

11. A communication method for communication by an entity of a network with a first device of the network, said method comprising:
following an inability of said entity to determine whether or not a data flow destined for or originating from said first device is associated with a cyber attack, sending, by said entity to said first device, a message proposing collaboration of the device in order to mitigate said cyber attack, said collaboration comprising:
execution, by the first device, of at least one determined action, called a collaborative action, during a communication of said first device with a second device distinct from the entity, said communication being in accordance with a given transport protocol and being routed via said network; and
sending, from the first device to the second device, an information message informing said second device of the execution by the first device of said at least one collaborative action during the communication, the information message further comprising at least one condition respected by the execution of the collaborative action during the communication.

12. The communication method as claimed in claim 11, furthermore comprising the entity receiving at least one item of information identifying at least one flow destined for said first device and consented to thereby, or identifying at least one flow destined for said first device and considered thereby to be a flow associated with a cyber attack.

13. The communication method as claimed in claim 12, wherein said at least one item of information is provided:
in a blocking command to block, by way of said entity, said at least one flow considered by the first device to be a flow associated with a cyber attack; or
in an authorization command to authorize routing of said at least one flow consented to by the first device.

14. The communication method as claimed in claim 11, furthermore comprising the entity sending, to said first device, a request to authorize routing, to said first device, of at least one data flow identified in said request.

15. The communication method as claimed in claim 11, furthermore comprising:
the entity receiving at least one data packet exchanged during said communication, comprising at least one header in which at least one item of control information for said communication from among a state of establishment of said communication, consent to send and/or receive data packets by way of said first device during said communication, and consent or lack of consent by said first device to said communication is indicated in unencrypted form; and
the entity using said at least one item of control information to mitigate the cyber attack.

16. The communication method as claimed in claim 11, wherein said at least one collaborative action comprises:
disclosing control information for said at least one communication; and/or
freezing migration of communication identifiers used during said at least one communication; or
deactivating use of said given transport protocol by said first device during said at least one communication.

17. A first device of a network, comprising:
a processor; and
a non-transitory computer readable medium comprising instructions stored thereon which when executed by the processor configure the first device to implement a method comprising:
following detection of a cyber attack, activate, on said first device, collaboration with at least one entity of the network in order to mitigate said cyber attack, said collaboration comprising executing, during said collaboration, at least one determined action, called a collaborative action, during a communication of said first device with a second device distinct from said at least one entity, said communication being in accordance with a given transport protocol and being routed via said network; and
sending, to the second device, an information message informing said second device of the execution by the first device of said at least one collaborative action during the communication, the information message further comprising at least one condition respected by the execution of the collaborative action during the communication.

18. A second device comprising:
a processor; and
a non-transitory computer readable medium comprising instructions stored thereon which when executed by the processor configure the second device to implement a method for communicating with a first device, the method comprising:
receiving an information message from the first device, informing the second device of execution, by the first device, of at least one determined action during a communication with the second device, said communication being in accordance with a given transport protocol and being routed via said network, said action, called a collaborative action, allowing collaboration with at least one entity of said network in order to mitigate a cyber attack, wherein the information message further comprises at least one condition respected by the execution of the collaborative action during the communication; and
in response to said second device accepting the execution of said collaborative action, informing the first device of an agreement.

19. An entity of a network, comprising:
a processor; and
a non-transitory computer readable medium comprising instructions stored thereon which when executed by the processor configure the entity to implement a method for communication with a first device of the network, the method comprising:
following an inability of said entity to determine whether or not a data flow destined for or originating from the first device of the network is associated with a cyber attack, sending, to said first device, a message proposing collaboration of the device in order to mitigate said cyber attack, said collaboration comprising:

execution, by the first device, of at least one determined action, called a collaborative action, during a communication of said first device with a second device distinct from the entity, the communication being in accordance with a given transport protocol and being routed via said network; and sending, from the first device to the second device, an information message informing said second device of the execution by the first device of said at least one collaborative action during the communication, the information message further comprising at least one condition respected by the execution of the collaborative action during the communication.

\* \* \* \* \*